United States Patent [19]

Quilty et al.

[11] 4,336,478
[45] Jun. 22, 1982

[54] METHOD OF EXTENDING THE LIFE OF A CATHODE RAY TUBE

[75] Inventors: John H. Quilty, Wilmington; Lawrence M. Scholten, Sudbury, both of Mass.

[73] Assignee: Itek Corporation, Lexington, Mass.

[21] Appl. No.: 142,584

[22] Filed: Apr. 21, 1980

[51] Int. Cl.³ ............................................. H01J 31/10
[52] U.S. Cl. .................................. 313/478; 340/720; 354/6; 358/220
[58] Field of Search ....................... 313/461, 478, 482; 358/220; 340/720, 755; 354/4, 6

[56] References Cited

U.S. PATENT DOCUMENTS 2,528,973 11/1950 Radman .......................... 313/482 X
3,517,593 6/1970 Overacker ............................. 354/6
3,599,026 8/1971 Tsuneta et al. ................. 313/482 X
4,267,555 5/1981 Boyd et al. ...................... 340/720 X Primary Examiner—Paul L. Gensler
Attorney, Agent, or Firm—Homer O. Blair; Robert L. Nathans; Gerald H. Glanzman

[57] ABSTRACT

A luminous trace of varying length is produced upon a first non-centralized portion of the screen of a cathode ray tube used in a phototypesetter for generating characters, and is precisely imaged upon positions of a photosensitive medium. The concentration of the electron beam to generate the required trace eventually burns out the phosphor. The life of the tube is greatly extended by thereafter rotating it to position a second non-centralized portion of the screen at the optical projection axis, and so on, and thus, the cathode ray tube life is greatly extended.

15 Claims, 1 Drawing Figure

METHOD OF EXTENDING THE LIFE OF A CATHODE RAY TUBE

DESCRIPTION

1. Technical Field

This invention relates to the field of cathode ray tube displays.

2. Background Art

A problem in the field of CRT displays has arisen with respect to the concentration of an electron beam trace upon relatively small portions of the phosphor screen, which concentration produces burn out of the phosphor. This condition is highly undesirable since burn out requires replacement of the CRT.

U.S. Pat. Nos. 3,517,593, 3,273,476, and 3,585,296 illustrate phototypesetting devices which employ a single luminous line trace upon the face of a CRT. Luminous traces of varying lengths are sequentially projected upon an imaging platen bearing a photosensitive medium, which projection records the photographic image of the characters to be phototypeset. Since the single line trace is continually concentrated on small central areas of the tube, the tube life is limited due to the burn out problem mentioned above.

It is an object of the present invention to provide an approach to greatly extend the life of the CRTs, which generate such line traces. It is a further object of the present invention to substantially eliminate the time and trouble of precisely realigning the position of a replacement CRT with respect to the imaging platen, owing to variations in the CRT parameters.

U.S. Pat. No. 2,976,758 illustrates an approach for preventing a bright image, such as the sun, from burning out a portion of an image orthicon. In accordance with this patent, an opaque disk is moved to follow the image of the sun, thereby to block its intense light from the surface of the image orthicon. Such an approach would be of no use in the solution of applicant's problem. U.S. Pat. Nos. 3,335,220, 2,953,710, 4,127,796, 3,255,309, 3,046,334, and 2,881,248 prevent burn out by slowly shifting the image continuously projected upon television cameras or the like, in order to prevent the above mentioned concentration of light upon small areas thereof. Such an approach would greatly complicate a phototypesetter employing single trace readout since the maintenance of very precise positioning of the line trace with respect to letter base lines upon the photosensitive medium are required in phototypesetting, in contrast with, for example, television applications. Furthermore, the required apparatus is relatively complex.

U.S. Pat. No. 3,233,141 teaches a planned position indication CRT display system wherein the yoke of the CRT tube is constantly rotated to in turn rotate the beam about the tube centerpoint. Should the CRT yoke cease rotating, this condition is detected to shut off the electron beam to prevent burnout. This patent teaches away from the present invention since the beam is continuously moved rather than maintained in the required fixed precise position with respect to a line of type focussed upon the photosensitive medium.

SUMMARY OF THE INVENTION

In accordance with the preferred embodiment of the invention, a simple solution is provided which greatly extends the life of the CRT, although a number of portions thereof are burned out, in contrast with the above mentioned prior art. The concentration of the trace upon a very small portion of the CRT, enables the precise positioning of the luminous trace with respect to the optical projection axis, and the price is eventual burn out. However, in accordance with the present invention, this does not significantly reduce the life of the CRT since provision is made for the rotation of the CRT through a predetermined angle after burn out, which occurs following an extended period of operation, so that a plurality of outer screen portions are sequentially positioned at the optical projection axis. Since relatively frequent replacement of the CRT is eliminated, the time and trouble of precisely realigning the position of the CRT and hence, the electron gun therein with respect to the imaging platen upon replacement, is also eliminated.

DETAILED DESCRIPTION

Figure 1:
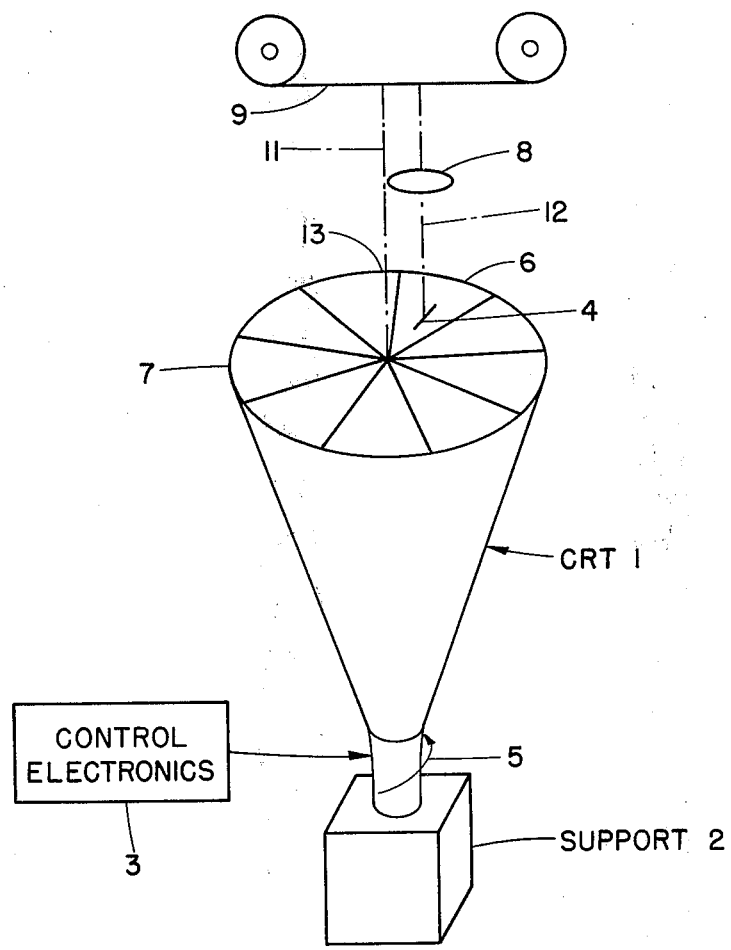

In the sole FIGURE, CRT 1 is mounted within support means 2, and is electrically coupled to control electronics 3, which produces a trace within a first outer pie shaped portion 6 of CRT screen 7. Projection lens 8 is positioned with respect to imaging platen 9 and luminous trace 4 to properly focus and precisely position the image of trace 4 upon imaging platen 9. The longitudinal axis of rotation 11, of CRT 1, is offset with respect to optical projection axis 12 as illustrated. Escapement means (not shown) causes relative motion between the photosensitive film positioned over platen 9 and the trace image on the CRT screen, as the length of trace 4 varies under the control of control electronics 3, to cause the characters to be recorded upon the photosensitive medium. Since this operation forms no part of the present invention, reference may be made to the above mentioned phototypesetter patents employing the single trace approach. The precise positioning of trace 4 with respect to the optical projection axis 12 eventually produces a burnout or near burnout condition in the first outer pie shaped screen portion 6. The operator then manipulates support means 2 to produce rotation of the tube indicated by arrow 5, to cause a second outer portion 13 to be positioned at optical projection axis 12, in place of outer portion 6. The CRT is no longer again rotated during the extended period of operation until the burn out condition is again apparent. The structure for permitting the rotation of CRT 1 from time to time may take many forms, as apparent to those skilled in the art, and thus such structure has not been described in detail in the interest of clarity and brevity. Spring loaded detent means, collars which may be tightened or loosened, a small motor, etc., may be employed. Since a single line trace occupies a relatively small pie-shaped portion of the CRT screen, many such portions may be from time to time, sequentially positioned at optical axis 12, so that the life of the CRT is greatly extended, while at the same time permitting the use of a trace which is highly concentrated at a precise position with respect to optical projection axis 12. As many as 16 or more of such pie shaped outer portions may extend about the face of the CRT screen, and yet only a small size CRT is required.

It should be understood that other components and configurations may be substituted for those described in order to practice the invention, and the invention is to be limited only by the permissable scope of the following claims. References are made in the claims to numbered components in the described embodiments, and it should be understood that the claims are not to be restricted to such embodiments, as the numbers employed in the claims are merely exemplary of the nature of the claimed means.

I claim:

1. A method of greatly extending the life of a cathode ray tube which includes a cathode ray tube screen having a centralized screen portion in the neighborhood of an axis of rotation about which said cathode ray tube screen may be rotated, and a plurality of noncentralized screen portions, comprising the steps of:
   a. generating a luminous image upon a first noncentralized portion of said screen over a first extended time period while maintaining said cathode ray tube screen stationary;
   b. thereafter rotating said cathode ray tube screen about said axis of rotation through a given angle after the termination of said first extended time period during which said luminous image is produced in said first outer portion of said screen;
   c. thereafter generating said luminous image in a second noncentralized portion of said screen over a second extended time period while maintaining said cathode ray tube screen stationary; and,
   d. thereafter again rotating said cathode ray tube screen about said axis of rotation through a given angle for enabling generation of a luminous image in a third noncentralized portion of said cathode ray tube screen during a third extended time period while said screen is maintained stationary.

2. The method as set forth in claim 1 further including the step of optically projecting said luminous image along an optical axis offset with respect to said axis of rotation.

3. The method as set forth in claims 1 or 2 wherein said luminous image is a straight line image fixed in position relative to the position of said axis of rotation, regardless of the rotary position of said screen.

4. The method of claims 1 or 2 wherein steps b and d are performed manually.

5. The method of claim 3 wherein steps b and d are performed manually.

6. A method of greatly extending the life of a cathode ray tube which includes a cathode ray tube screen having a centralized screen portion in the neighborhood of an axis of rotation about which said cathode ray tube screen may be rotated, and a plurality of noncentralized screen portions comprising the steps of:
   a. generating a luminous image upon a first noncentralized portion of said screen, but not in said centralized portion thereof over a first extended time period while maintaining said cathode ray tube screen stationary;
   b. thereafter rotating said cathode ray tube screen about said axis of rotation through a given angle after the termination of said first extended time period during which said luminous image is produced in said first outer portion of said screen;
   c. thereafter generating said luminous image in a second noncentralized portion of said screen, but not in said centralized portion thereof over a second extended time period while maintaining said cathode ray tube screen stationary; and,
   d. thereafter again rotating said cathode ray tube screen about said axis of rotation through a given angle for enabling generation of said luminous image in a third noncentralized portion of said cathode ray tube screen while said screen is maintained stationary.

7. The method as set forth in claim 6 further including the step of optically projecting said luminous image along an optical axis offset with respect to said axis of rotation.

8. The method as set forth in claims 6 or 7 wherein said luminous image is a straight line image fixed in position relative to the position of said axis of rotation, regardless of the rotary position of said screen.

9. The method of claims 6 or 7 wherein steps b and d are performed manually.

10. The method of claim 8 wherein steps b and d are performed manually.

11. A method of greatly extending the life of a cathode ray tube which includes a circular cathode ray tube screen having a centralized screen portion in the neighborhood of an axis of rotation about which said cathode ray tube screen may be rotated, and a plurality of pie-shaped noncentralized screen portions, comprising the steps of:
   a. generating a radially extending luminous straight line image upon a first noncentralized portion of said screen, but not in said centralized portion thereof over a first extended time period while maintaining said cathode ray tube screen stationary;
   b. thereafter rotating said cathode ray tube screen about said axis of rotation through a given angle less than 90° after the termination of said first extended time period during which said luminous straight line image is produced in said first outer portion of said screen;
   c. thereafter generating said luminous straight line image in a second noncentralized portion of said screen, but not in said centralized portion thereof over a second extended time period while maintaining said cathode ray tube screen stationary; and,
   d. thereafter again rotating said cathode ray tube screen about said axis of rotation through a given angle for enabling generation of said luminous straight line image in a third noncentralized portion of said cathode ray tube screen while said screen is maintained stationary.

12. The method as set forth in claim 11 further including the step of optically projecting said luminous straight line image along an optical axis offset with respect to said axis of rotation.

13. The method as set forth in claims 11 or 12 wherein said luminous straight line image is fixed in position relative to the position of said axis of rotation, regardless of the rotary position of said screen.

14. The method of claim 11 and 12 wherein steps b and d are performed manually.

15. The method of claim 13 wherein steps b and d are performed manually.

* * * * *